(12) United States Patent
Ranasinghe

(10) Patent No.: US 8,930,484 B2
(45) Date of Patent: Jan. 6, 2015

(54) SYSTEMS AND METHODS FOR PROVIDING SYNCHRONIZATION IN A NETWORKED ENVIRONMENT

(75) Inventor: Ravindra Sanath Ranasinghe, New South Wales (AU)

(73) Assignee: Tymphany Hong Kong Limited, Sausalito, CA (US)

( * ) Notice: Subject to any disclaimer, the term of this patent is extended or adjusted under 35 U.S.C. 154(b) by 196 days.

(21) Appl. No.: 13/380,553

(22) PCT Filed: Jun. 30, 2010

(86) PCT No.: PCT/AU2010/000824
§ 371 (c)(1),
(2), (4) Date: Dec. 23, 2011

(87) PCT Pub. No.: WO2011/000041
PCT Pub. Date: Jan. 6, 2011

(65) Prior Publication Data
US 2012/0117180 A1 May 10, 2012

Related U.S. Application Data

(60) Provisional application No. 61/221,931, filed on Jun. 30, 2009.

(30) Foreign Application Priority Data

Jun. 30, 2009 (AU) ................................. 2009903042

(51) Int. Cl.
*G06F 15/16* (2006.01)
*H04J 3/06* (2006.01)
*H04L 12/403* (2006.01)

(52) U.S. Cl.
CPC ............. *H04J 3/0667* (2013.01); *H04L 12/403* (2013.01)

USPC .......... 709/208; 713/500; 708/160; 375/371; 370/503; 370/345

(58) Field of Classification Search
USPC ................... 713/500; 709/208; 370/503, 345; 375/371
See application file for complete search history.

(56) References Cited

U.S. PATENT DOCUMENTS 7,876,791 B2 * 1/2011 Jung et al. .................... 370/503
2003/0177154 A1 * 9/2003 Vrancic ....................... 708/160
(Continued)

FOREIGN PATENT DOCUMENTS

GB       2429610 B       9/2010

OTHER PUBLICATIONS

International Search Report—2 pgs, Aug. 24, 2010, Avega Systems PTY LTD.

*Primary Examiner* — Kyung H Shin
(74) *Attorney, Agent, or Firm* — Tarolli, Sundheim, Covell & Tummino LLP

(57) ABSTRACT

Described herein are systems and methods for synchronization in a networked environment. For example, some embodiments provide methods for synchronizing a client device having a client media time reference with a server device having a server media time reference. In some cases such methods are embodied in computer readable code that is executable on one or more processors. Furthermore, some embodiments provide hardware, such as networked media devices that are configured to perform such methods. In overview, in some embodiments a client obtains timing information from a server and, on the basis of this timing information, applies an adjustment to a client control time reference, thereby to synchronize the client media time reference with the server media time reference. Some embodiments are particularly directed to the situation where there is a desire to synchronize networked media devices across a combination of wired and wireless networks.

19 Claims, 21 Drawing Sheets

(56) References Cited

U.S. PATENT DOCUMENTS

| | | |
|---|---|---|
| 2005/0059353 A1 | 3/2005 | Smith et al. |
| 2007/0226530 A1* | 9/2007 | Celinski et al. ............... 713/500 |
| 2008/0187282 A1 | 8/2008 | Brady et al. |
| 2010/0020909 A1* | 1/2010 | Jung et al. .................... 375/371 |

* cited by examiner

SYSTEMS AND METHODS FOR PROVIDING SYNCHRONIZATION IN A NETWORKED ENVIRONMENT

CROSS-REFERENCE TO RELATED APPLICATION

This application is a U.S. National Stage Application filed under 35 U.S.C. §371 of PCT/AU2010/000824, filed Jun. 30, 2010, and entitled Systems and Methods for Providing Synchronization in a Networked Environment, which claims the benefit of Australian Patent Application No. 2009/903042, filed on Jun. 30, 2009 and U.S. Provisional Patent Application No. 61/221,931, filed on Jun. 30, 2009, and entitled Systems and Methods for Providing Synchronization in a Networked Environment. The entire contents of each of the above-identified patent applications are incorporated herein by reference.

FIELD OF THE INVENTION

The present invention relates to systems and methods for providing synchronization in a networked environment. Embodiments of the invention have been particularly developed to allow the synchronization of media devices in a hybrid networked environment, for instance where two such devices are respectively connected to different wireless and/or wired networks. While some embodiments will be described herein with particular reference to that application, it will be appreciated that the invention is not limited to such a field of use, and is applicable in broader contexts.

BACKGROUND

Any discussion of the prior art throughout the specification should in no way be considered as an admission that such prior art is widely known or forms part of common general knowledge in the field.

It is often desirable to provide playback of multiple audio and/or video channels in a networked environment, for example in the context of a wireless home theater system including a plurality of wireless speaker units. For such systems, individual multimedia devices need to be synchronized, typically with the accuracy of a few microseconds. Failure to accurately synchronize devices often results in a poor user experience, and the production of unwanted playback effects.

Some synchronization techniques rely on frequency synchronizing a server and a client local clock within devices that are connected to a shared medium, with reference to a separate global clock observable by all devices coupled to that wireless network. However, wired networks typically do not have an observable global clock, as switch devices typically isolate the individual carriers to avoid collisions. Therefore these techniques are substantially isolated to topologies where the devices are connected to a shared medium. In some cases, the devices whose clocks are to be synchronized are connected by a network having different communication media. For example, one device may be connected to a network through an IEEE 802.3 based wired connection using an Ethernet interface while another device may be connected through an IEEE 802.11 based wireless LAN connection using a wireless LAN interface. These different types of communication links may have distinct transmission properties and link capacities.

There is a need in the art for improved systems and methods for synchronization in a networked environment.

SUMMARY

One embodiment provides a method, performed by a networked slave device, for synchronizing a local clock with respect to a master clock of a master device, the method including:
(a) providing a group of probe frames to the master device, thereby to receive responses in respect of at least a selection of these probe frames, wherein each response includes data for allowing determination of an estimated clock offset;
(b) filtering the responses, thereby to identify one or more best responses for the group of probe frames;
(c) repeating steps (a) and (b) for successive groups of probe frames thereby to identify a respective one or more best responses for the successive groups of probe frames;
(d) selectively calculating estimated clock offset values based on the one or more best responses in respect of each group of probe frames, thereby to determine a relative clock offset drift; and
(e) repeatedly adjusting the local clock based on calculations of the relative clock offset drift.

One embodiment provides a networked device, configured to operate as a networked slave device, for synchronizing a local clock of the salve device with respect to a master clock of a master device, the device being configured for performing a method including:
(a) providing a group of probe frames to the master device, thereby to receive responses in respect of at least a selection of these probe frames, wherein each response includes data for allowing determination of an estimated clock offset;
(b) filtering the responses, thereby to identify one or more best responses for the group of probe frames;
(c) repeating steps (a) and (b) for successive groups of probe frames thereby to identify a respective one or more best responses for the successive groups of probe frames;
(d) selectively calculating estimated clock offset values based on the one or more best responses in respect of each group of probe frames, thereby to determine a relative clock offset drift; and
(e) repeatedly adjusting the local clock based on calculations of the relative clock offset drift.

One embodiment provides a non transitive computer readable medium carrying computer executable code that, when executed by one or more processors of a device, configure the device to perform a method according to claim 1.

One embodiment provides a networked device configured to perform a method as described herein.

One embodiment provides a computer program product for configuring a networked device configured to perform a method as described herein.

One embodiment provides a carrier medium maintaining computer executable code for configuring a networked device configured to perform a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Particular embodiments may provide all, some, or none of these aspects, features, or advantages. Particular embodiments may provide one or more other aspects, features, or advantages, one or more of which may be readily apparent to a person skilled in the art from the drawings, descriptions, and claims herein.

DETAILED DESCRIPTION OF EMBODIMENTS

Figure 1:
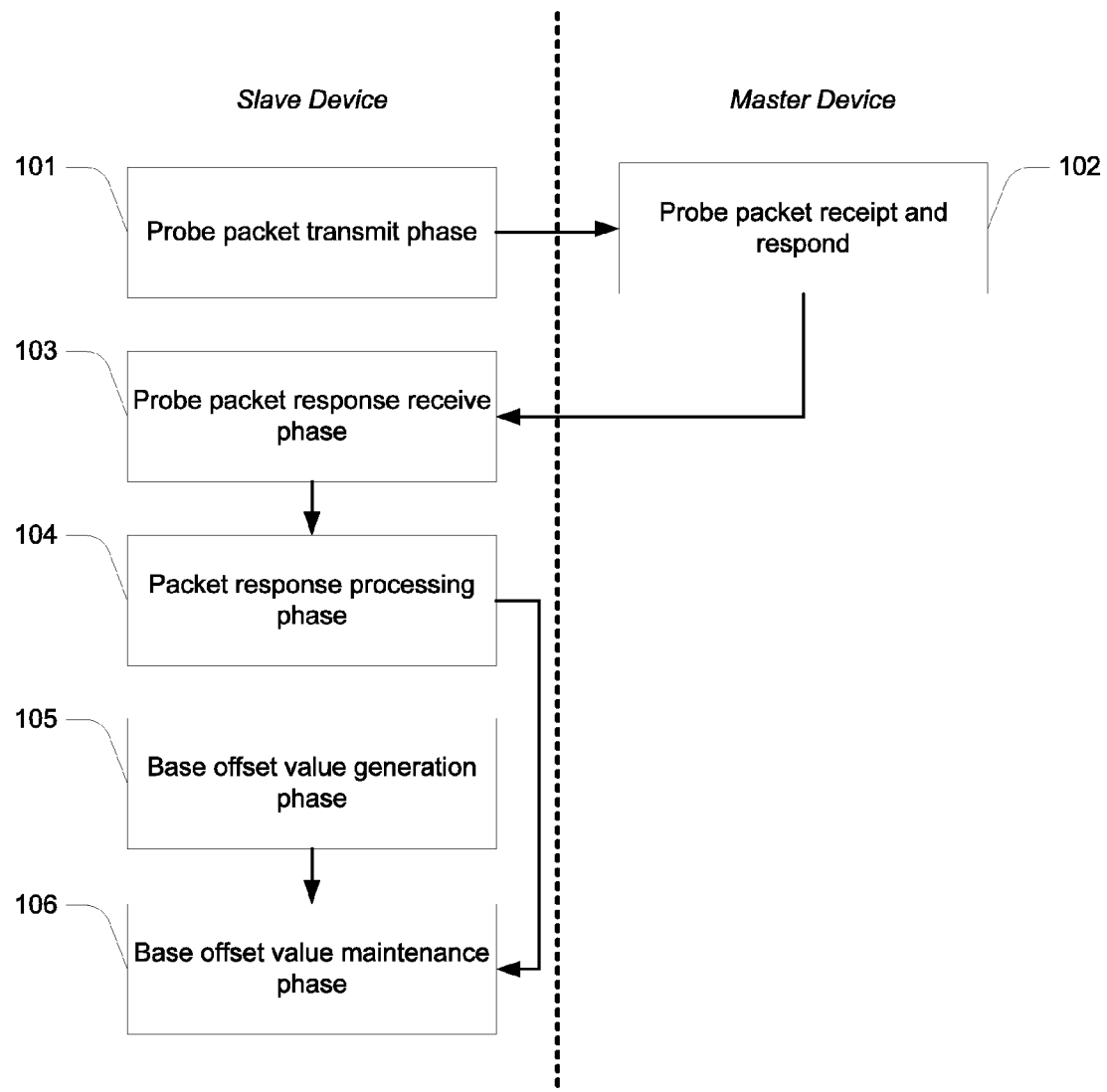
FIG. 1 shows a method according to one embodiment.

Described herein are systems and methods for synchronization in a networked environment. For example, some embodiments provide methods for synchronizing a client device having a client media time reference with a server device having a server media time reference. In some cases such methods are embodied in computer readable code that is executable on one or more processors. Furthermore, some embodiments provide hardware, such as networked media devices that are configured to perform such methods. In overview, in some embodiments a client obtains timing information from a server and, on the basis of this timing information, applies an adjustment to a client control time reference, thereby to synchronize the client media time reference with the server media time reference. Some embodiments are particularly directed to the situation where there is a desire to synchronize networked media devices across a combination of wired and wireless networks.

The present disclosure is directed towards systems and methods of synchronizing a set of clocks to a common master clock, in the context of a networked environment. In some cases, the devices whose clocks are to be synchronized are connected by a network having different communication media. For example, one device may be connected to a network through an IEEE 802.3 based wired connection using an Ethernet interface while another device may be connected through an IEEE 802.11 based wireless LAN connection using a wireless LAN interface. These different types of communication links may have distinct transmission properties and link capacities. As general context, for a collection of networked, one device is designated to function as a master device, and other devices (referred to as slave devices) synchronize their respective clocks by reference to the master device. Embodiments described herein are focused on a situation where a plurality of networked media devices (such as speaker units, speaker systems, video devices, and other audio/video devices) are configured to operate together to provide synchronous media playback.

For the present purposes, the terms "master" and "slave" are respectively used interchangeably with the terms "server" and "client". Furthermore, the term "node" is used to describe a networked device.

The term "synchronization" should be read broadly to include any one or more of time, frequency and phase synchronization. This may be achieved though a number of approaches such as (but not limited to) frequency locked loops and phase locked loops. It will be appreciated that "synchronized" and "synchronization" are absolute terms, however in this context they are defined to include situations where synchronization is within some predefined or abstract limit. These limits are typically imposed by the application for which synchronization is required. That is, the term "synchronization" essentially means "substantial synchronization".

A time reference (or equivalently a timing reference), in some embodiments, is in the form of a counter that increments by a known amount at each cycle of a clock. A "control time reference" (or equivalently "control timing reference") is indicative of a clock or counter that is configured to provide a time base for measuring timing information, for example Time Synchronization Function (TSF) as defined in IEEE 802.11. Such a time base typically has a sufficient resolution to provide the desired level of synchronization.

Method Overview

One embodiment provides a software-based synchronization approach which is designed to reliably operate on such a network to synchronize a distributed set of clocks to a level required for an A/V system. A method in accordance with such an embodiment is illustrated in FIG. 1. This method is repeated continuously to maintain synchronization, preferably approximately every 500 ms.

Phase 101 includes a slave device transmitting one or more probe packets to a master device with which it wishes to synchronize clocks. In the present embodiments a plurality of probe packets are sent as a group. At 102, the master device receives the probe packets (assuming delivery is successful), and provides responses in respect of the received packets. These responses are received by the slave device at 103 (again assuming successful delivery).

Phase 104 includes, at the slave device, performing a process for selecting the best responses from those received. This presently includes, in respect of each transmitted group, narrowing the selection based on RTT value and comparison with previous results (referred to below as correlation). Those packets which pass through correlation are used to provide a starting offset value (phase 105), and/or maintain a base offset value for ongoing use (phase 106), thereby to allow synchronization of the slave clock to the master clock.

Exemplary Network Implementations

Figure 2A:
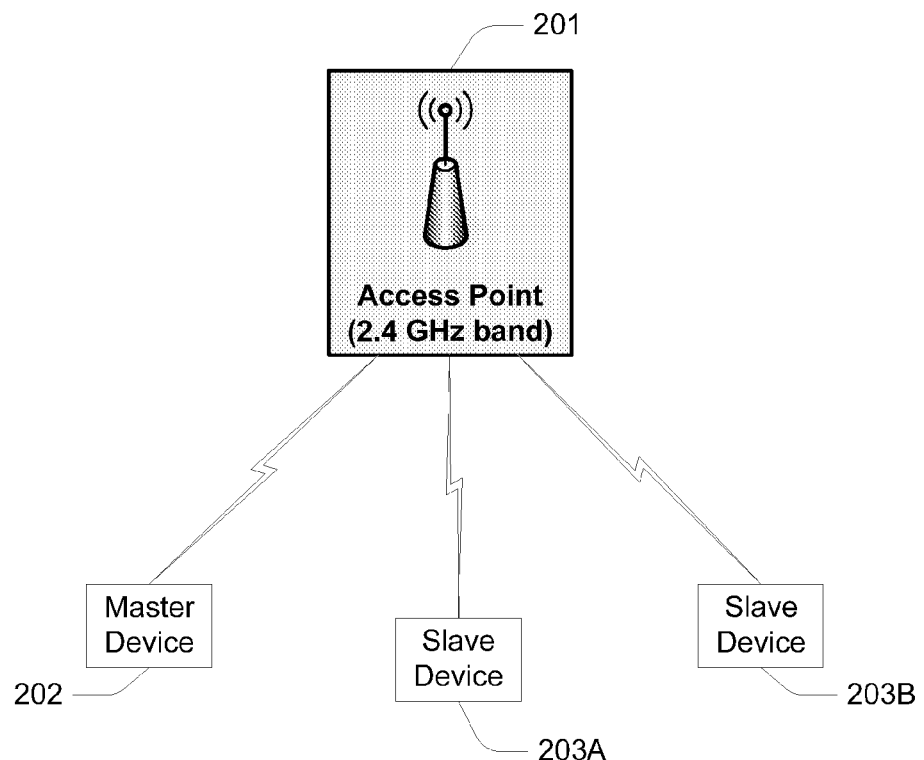
FIG. 2A is a block diagram showing all the nodes connected through a single access point using wireless medium.

This section summarizes possible use case scenarios under which the present synchronization methods are used in various embodiments, optionally in combination with existing TSF-based clock synchronization methods (such as that disclosed in U.S. Pat. No. 7,359,889). In particular, synchronization between nodes (i.e. master device and slave devices) under the configuration of FIG. 2A is preferably based on an existing TSF based algorithm (such as that of U.S. Pat. No. 7,359,889). Synchronization between nodes for the other illustrated configurations is based on embodiments described herein detailed in this document.

The configuration of FIG. 2A includes a single access point 201, a master device 202 and two slave devices 203A and 203B. Master device 202 and slave devices 203A and 203B are interconnected using the wireless medium through the single wireless access point 201.

Figure 2B:
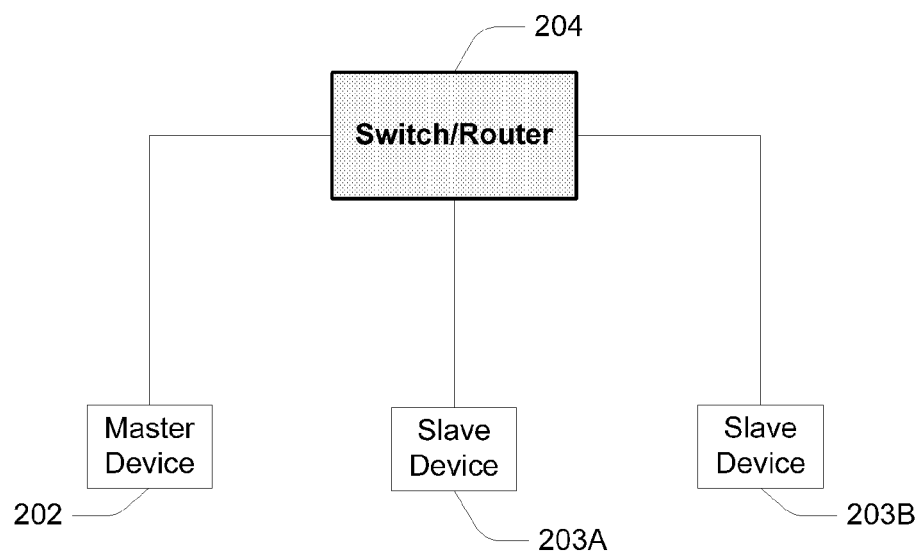
FIG. 2B is a block diagram showing all the nodes connected through a single switch/router using Ethernet medium.

FIG. 2B is a configuration including a single switch/router 204, a master device 202 and two slave devices 203A and 203B. The master device and slave devices are interconnected using Ethernet through the single switch/router.

Figure 2C:
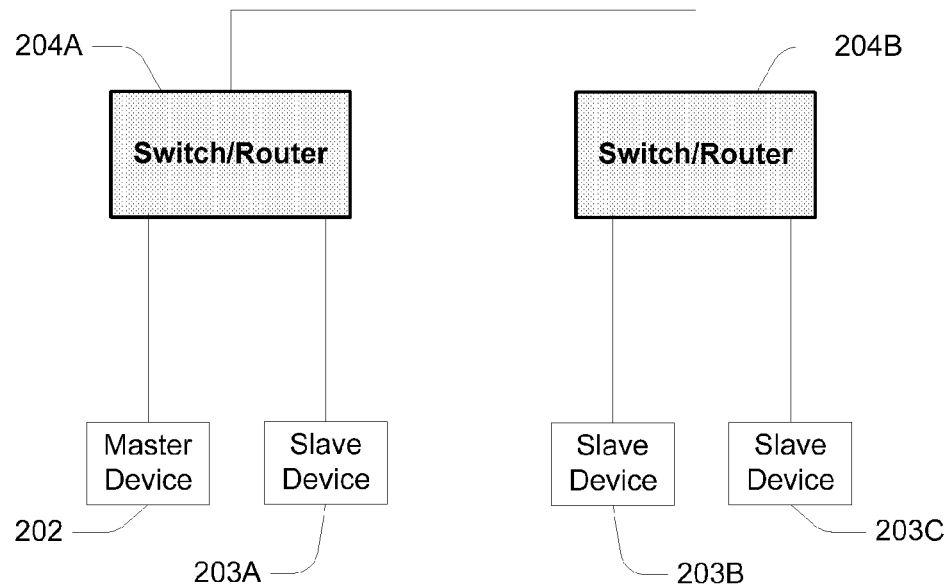
FIG. 2C is a block diagram showing all the nodes connected through multiple switches/routers using Ethernet medium.

The configuration of FIG. 2C is similar to that of FIG. 2B, but includes multiple switches/routers 204A and 204B. Master device 202 and all slave devices 203A, 203B and 203C are interconnected using Ethernet through the multiple switches/routers 204A and 204B.

Figure 2D:
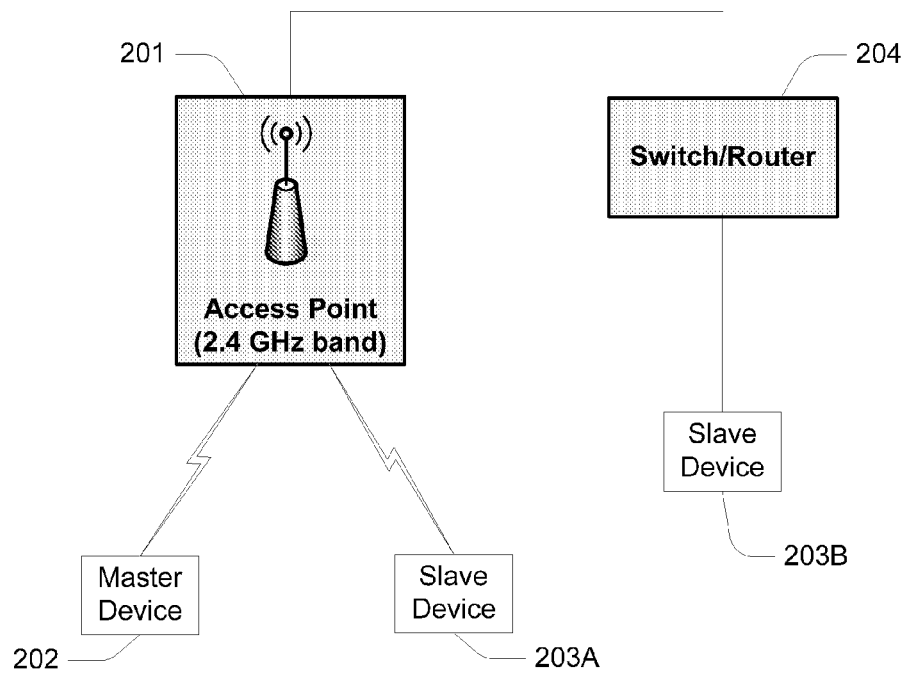
FIG. 2D is a block diagram showing the nodes connected through multiple devices involving an access point and a switch/router, wherein the master device is connected to the access point.

FIG. 2D illustrates a configuration including an access point 201, a switch/router 204, a master device 202, and slave devices 203A and 203B. The master device and the slave devices are interconnected through Ethernet and wireless medium. In this particular configuration, master device 202 is connected to the access point 201 through wireless medium.

Figure 2E:
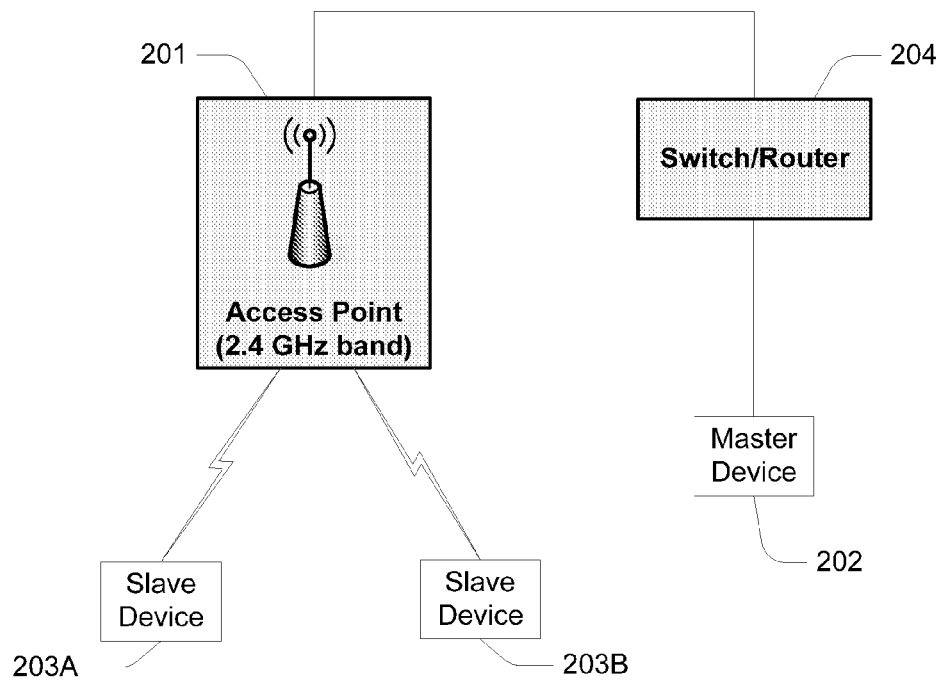
FIG. 2E is a block diagram showing the nodes connected through multiple devices involving an access point and a switch/router, wherein the master device is connected to the switch/router.

FIG. 2E is similar to that of FIG. 2D, in that master device 202 and slave devices 203A and 203B are interconnected through Ethernet and wireless medium. However, it the configuration of FIG. 2E, the master device is connected to the switch/router 204 through Ethernet.

Figure 2F:
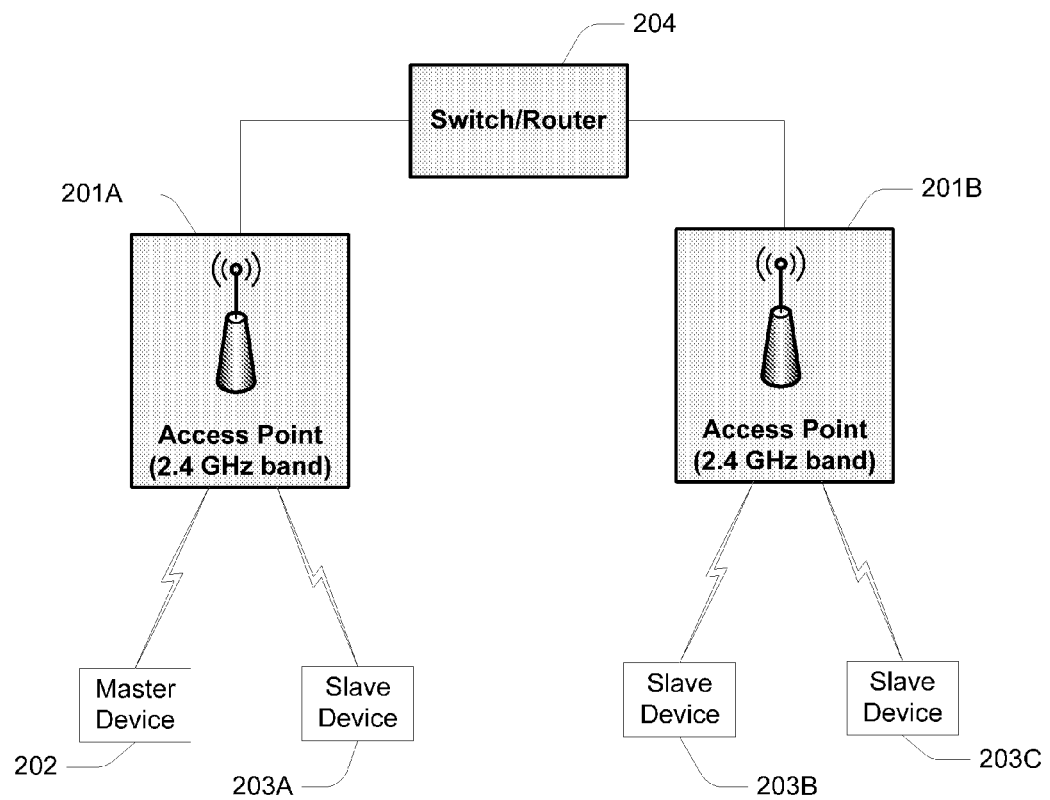
FIG. 2F is a block diagram showing all the nodes connected through multiple access points operating on the same frequency band.

The configuration of FIG. 2F includes a switch/router 204 and two access points 201A and 201B. The access points operate on the same frequency band, in this case 2.4 GHz. Master device 202 and slave devices 203A, 203B and 203C are interconnected through the wireless medium of access points 201A and 201B.

Figure 2G:
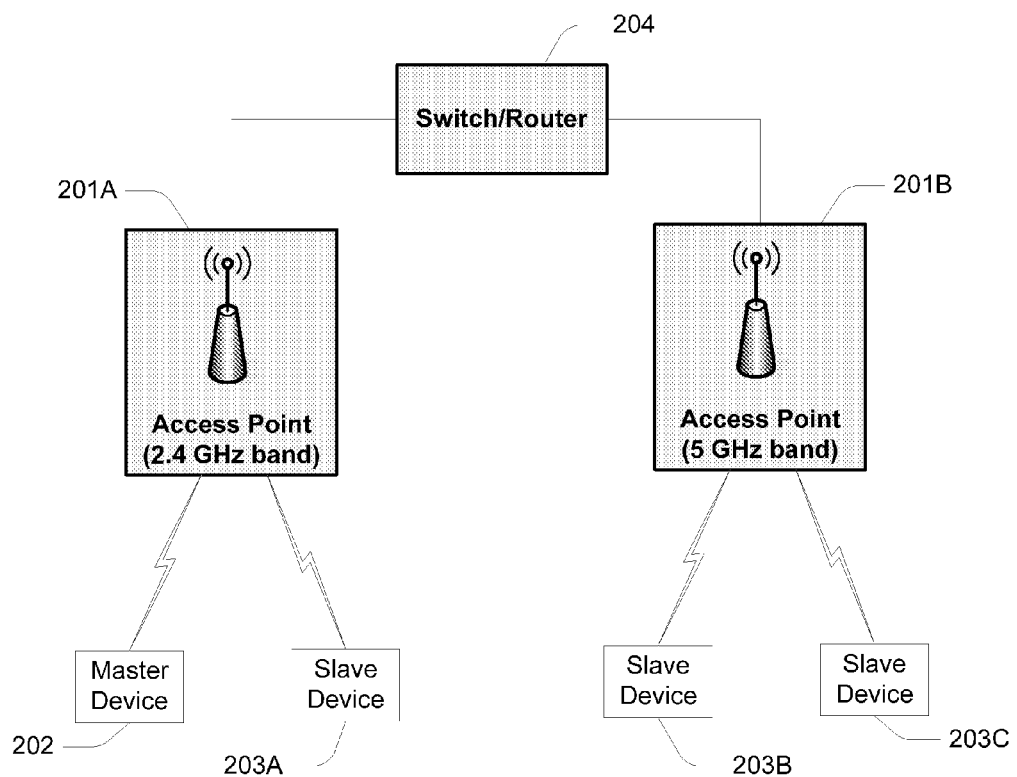
FIG. 2G is a block diagram showing the nodes connected through multiple access points operating on different frequency bands.

FIG. 2G also includes a switch/router 204 and two access points 201A and 201B. In this particular configuration, access points 201A and 201B operate on different frequency bands, for example 2.4 GHz and 5 GHz respectively. The master device and slave devices are connected to different access points through wireless medium. In this particular, configuration master device 202 is connected through the wireless medium to the 2.4 GHz access point 201A.

Figure 2H:
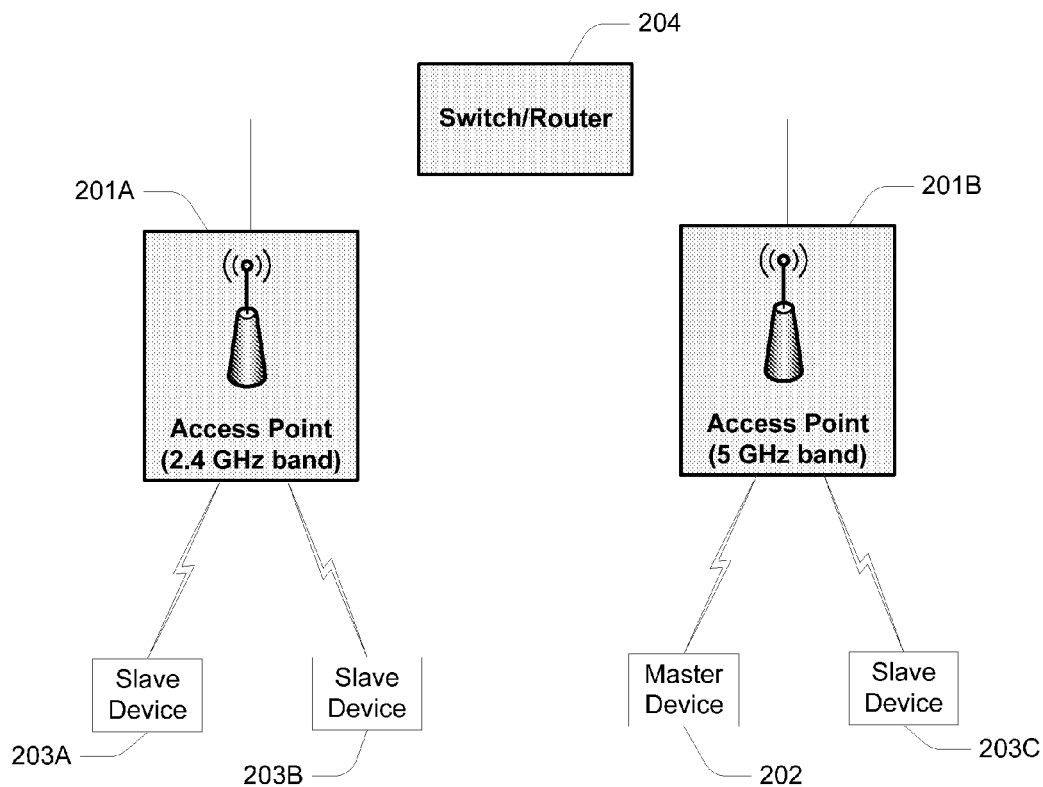
FIG. 2H is a block diagram similar to FIG. 2G but with the master device connected to the access point operating on a different frequency band to that in which the master device is connected to in FIG. 2G.

FIG. 2H is similar to FIG. 2G, but with master device 202 connected through the wireless medium to the 5 GHz access point 201B.

Figure 2I:
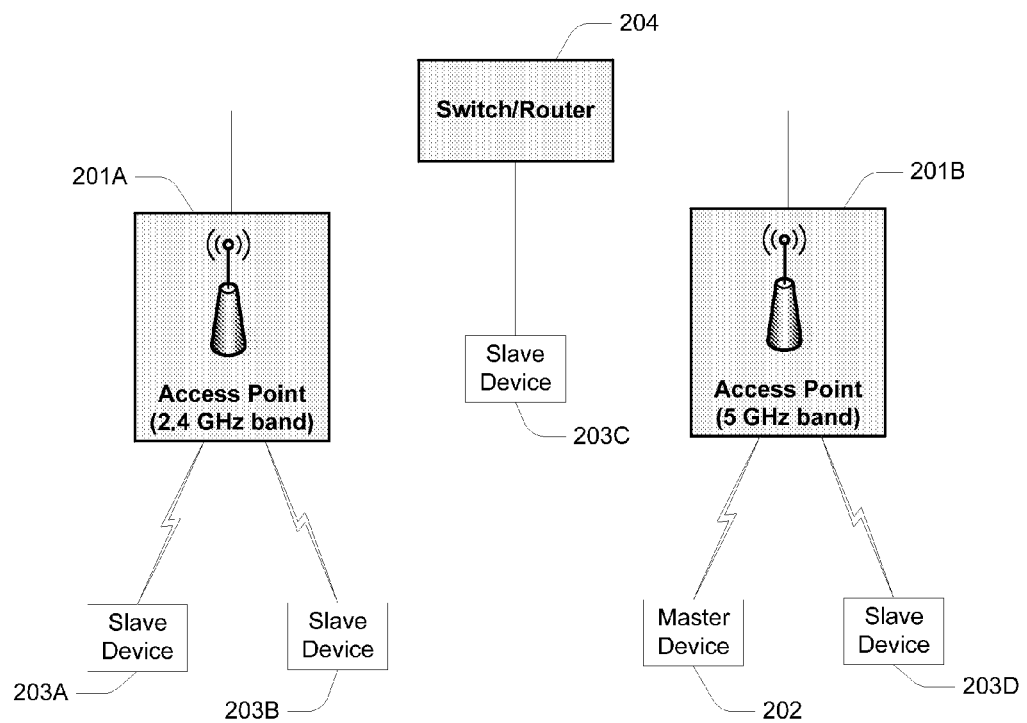
FIG. 2I is a block diagram showing the nodes connected through multiple devices involving several access points and a switch/router, wherein the access points operate on different frequency bands and the master device is connected to one of the access points.

The configuration of FIG. 2I includes multiple devices involving access points 201A and 201B and switch/router 204. The access points again operate on different frequency bands. In this case, master device 202 and slave devices 203A, 203B, 203C and 203D are interconnected through wireless medium as well as Ethernet. The master device in this instance is connected through the wireless medium to the 5 GHz access point 201B.

Figure 2J:
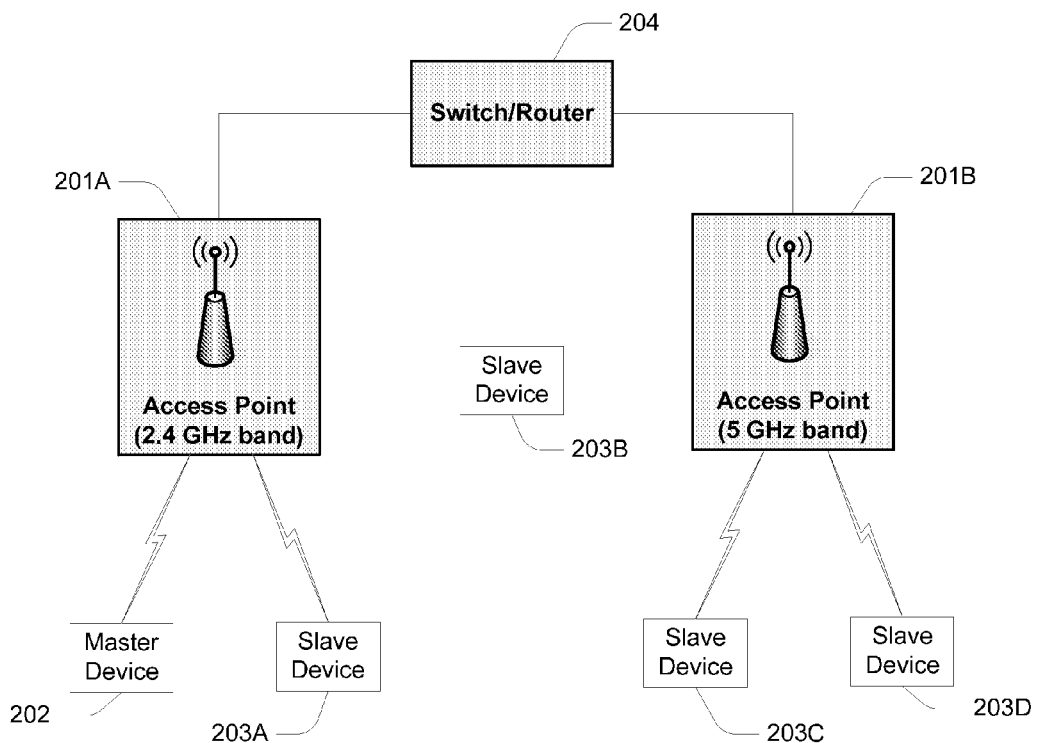
FIG. 2J is a block diagram similar to FIG. 2I but with the master device connected to the access point operating on a different frequency band to that in which the master device is connected to in FIG. 2I.

FIG. 2J is a similar configuration to that of FIG. 2I. However, in this case, master device 202 is connected through the wireless medium to the 2.4 GHz access point 201A.

Figure 2K:
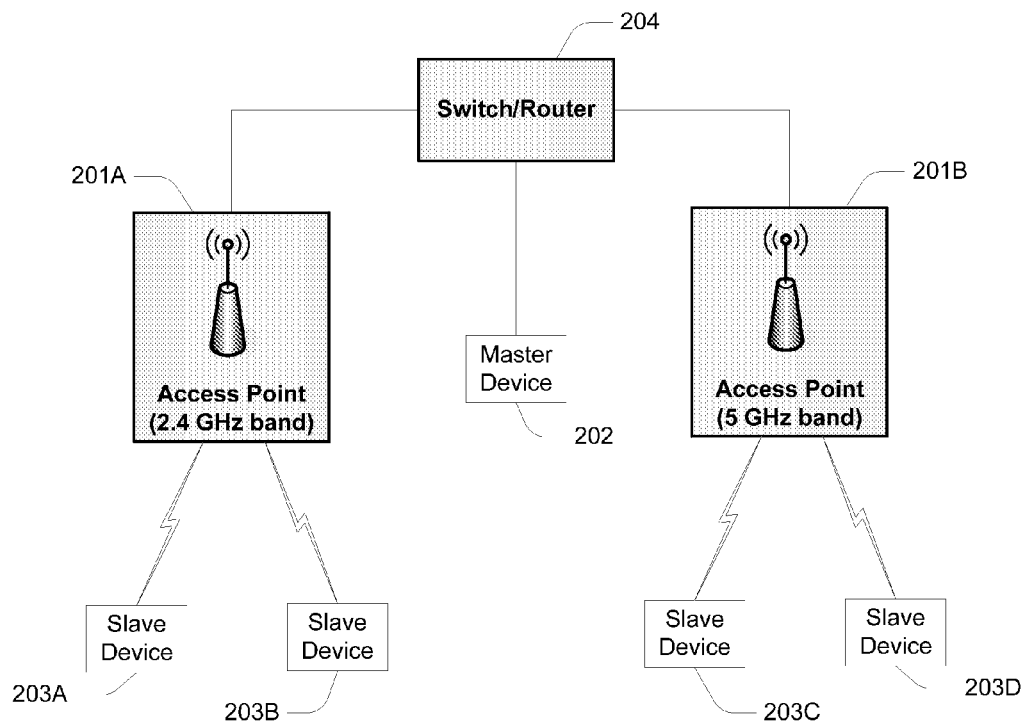
FIG. 2K is a block diagram similar to FIG. 2I but with the master device connected to the switch/router.

FIG. 2K is another example that is similar to the configurations of FIGS. 2I and 2J. In this particular configuration, master device 202 is connected through Ethernet to the switch/router 204.

Estimation of Clock Offset

Figure 3:
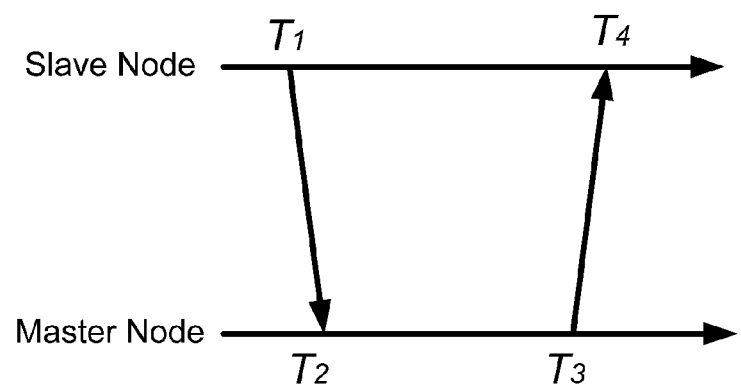
FIG. 3 illustrates the timing of probe frame handling according to one embodiment.

In overview, a slave node willing to be synchronized with a specified master node sends a plurality of probe packets to that master node. At the time of transmitting a probe packet, the slave includes a time stamp $T_1$ with respect to its own clock in the probe packet. At the time of receiving a probe packet, the master inserts a time stamp $T_2$ with respect to the master's clock for the received time. Then the master holds the probe packet for a specified time interval before returning a reply. At the time of returning the reply, it will insert a time stamp $T_3$ with respect to its own clock. Upon receiving the reply, the slave node which originated the probing inserts a time stamp $T_4$ with respect to its own clock. This is schematically illustrated in FIG. 3.

It is important to note that the two transmission time related timestamps $T_1$ and $T_3$ and two receiving time related timestamps $T_2$ and $T_4$ are taken with respect to the nodes' respective clocks that are to be synchronized.

It is possible to compute the network delay from slave node to master and master to slave node as follows.

$$\text{netDelay}_{S \to M} = (T_2 - T_1) \to \qquad \text{Eq. (1)}$$

$$\text{netDelay}_{M \to S} = (T_3 - T_4) \to \qquad \text{Eq. (2)}$$

If the network delay difference between $\text{netDelay}_{S \to M}$ and $\text{netDelay}_{M \to S}$ called differential delay is small (i.e the network delays are not significantly asymmetrical), it is possible to compute the clock offset θ between the slave clock and the master clock as follows:

$$\theta = \frac{(\text{netDelay}_{S \to M} + \text{netDelay}_{M \to S})}{2} \qquad \text{Eq. (3)}$$

$$\theta = \frac{((T_2 - T_1) + (T_3 - T_4))}{2} \to$$

It is also possible to estimate the current network round trip delay as:

$$RTT = \text{netDelay}_{S \to M} - \text{netDelay}_{M \to S}$$

$$RTT = (T_4 - T_1) - (T_3 - T_2) \to \qquad \text{Eq. (4)}$$

The estimated clock offset θ represents the relative distance between the master clock and the slave clock.

Synchronizing the Clocks Using the Offset

After computing the offset between the slave clock and the master clock at some point in time, that value is retained as the base clock offset $\theta_0$ between the two clocks. Following this, the present approach is to compute the clock offset at regular intervals, and check how far the current clock offset has drifted from the base one. This difference is referred to as the "relative clock offset drift", and is used as the basis to adjust the slave clock. The relative clock offset drift is referred to as clkerr$_i$, and the following equations apply:

$$clkerr_i = \theta_i - \theta_0 \rightarrow \qquad \text{Eq. (5)}$$

$$clkerr_i = \left[\frac{((T_2 - T_1) + (T_3 - T_4))}{2}\right]_i - \left[\frac{((T_2 - T_1) + (T_3 - T_4))}{2}\right]_0 \rightarrow \qquad \text{Eq. (6)}$$

The objective of this synchronization algorithm is to minimize the relative clock offset drift, i.e. clkerr$_i$. Therefore, a key point of distinction difference between the present embodiments and NTP (which shares some similarities with the present embodiments) is that, by the present approach, there is no changing or modification of the absolute value of the slave clock to match the absolute value of the master clock. Rather, the present approach is to change only the phase value and/or frequency of the slave clock to maintain same clock offset between the master and the slave. That is, the rate of change of slave clock is brought into alignment with the speed of the master clock (after a certain point).

This is purely a software based synchronization algorithm, without the need to adjust the absolute clock time. However, the slave can determine the absolute value of the master clock by adding the offset value to its absolute clock value. Details of this mechanism are described in detail further below.

The accuracy of the estimated clock offset value θ in Eq. (3) depends on three factors:

Network delays: If the network delays in forward path (i.e. from slave to master) and the reverse path (i.e. from master to slave) are significantly different, then the differential delay would be dominant in θ than the true clock offset.

Accuracy of the timestamps: As shown in FIG. 1, both T$_1$ and T$_3$ represent the beginning of transmission events while T$_2$ and T$_4$ represent the beginning of receiving events. To account for this, embodiments of the present invention perform timestamping at the lowest possible point (i.e. very close to the actual physical transmission and reception) to reduce the impact of any processing delays.

Accuracy of clocks: This aspect is related to the stability of the clock. The present methodologies do not in themselves act to improve the accuracy of clock behavior; however it assumes that participating clocks are fairly stable. The algorithms described herein act to bring the rate of operation (i.e. frequency and phase) of clocks to synchronize them to a common value.

In media applications (particularly audio and/or video applications) it is preferable to achieve clock synchronization between participating devices with μs resolution. Therefore it is preeminent to have very accurate clock offset estimates θ, as this is the basis to calculate the relative drift and the VCO feed value. For this reason, functionalities are provided for suppressing random variations of θ due to variations in network delay.

Method Detail

Synchronization methods according to various embodiments are described below in greater detail. An exemplary method is also provided via FIG. 4 to FIG. 7. These methods illustrate various functionalities which are preformed to increase resolution and accuracy in synchronization.

Figure 4:
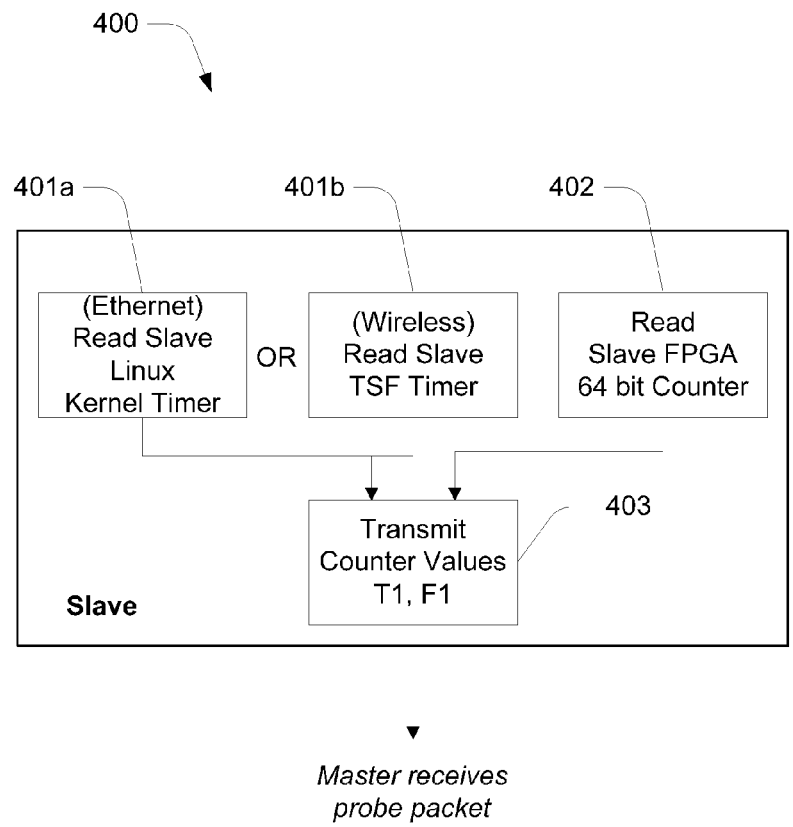
FIG. 4 illustrates a method according to one embodiment.

FIG. 4 illustrates a method 400 performed by a slave device. Method 400 includes reading a local timer value, being either a Linux slave kernel timer at 401a (in the case of a wired Ethernet device), or a slave TSF timer at 401b (in the cases of a wireless device). A slave FPGA counter is read at 402, and counter values T1 and F1 transmitted at step 403 within a probe packet.

Figure 5:
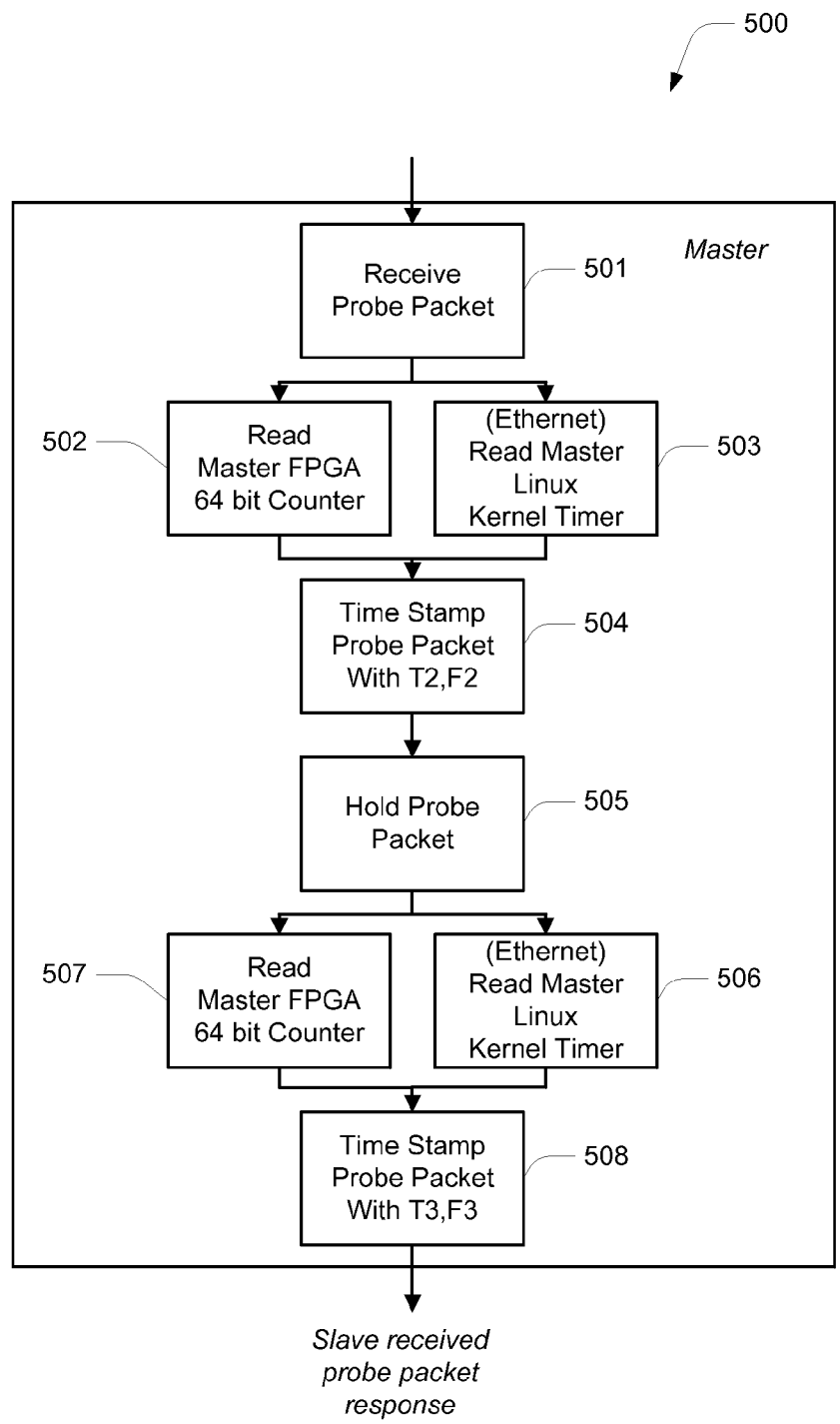
FIG. 5 illustrates a method according to one embodiment.

FIG. 5 illustrates a method 500 performed by a master device upon receipt of a probe packet. The probe packet is received at 501. The master FPGA counter is read at 502, and in the case of a wired device the master Linux kernel timer is read at 403 9 for the present purposes we assume the master device is a wired device). The probe packet is time stamped with T2 and F2 at 404, and the probe packet held for a designated period (represented by block 504). Method 500 then includes reading a local timer value, being a Linux slave kernel timer at 505 (in the case of a wired Ethernet device) and the FPGA at 506. The probe packet is thereafter stamped with counter values T3 and F3 at 507, and transmitted at step 508 as a probe packet response (which is received by the slave device).

Figure 6:
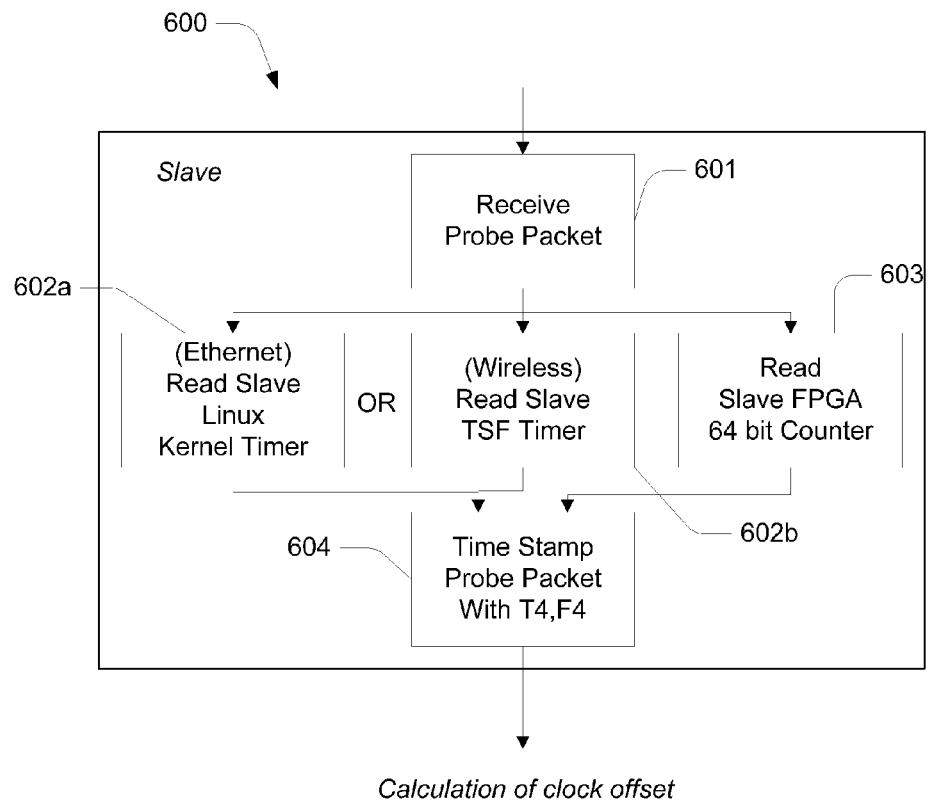
FIG. 6 illustrates a method according to one embodiment.

Following receipt of the probe packet, the slave performs method a method such as method 600 of FIG. 6. Method 600 includes receiving the probe response at 601, reading a local timer value, being either a Linux slave kernel timer at 602a (in the case of a wired Ethernet device), or a slave TSF timer at 602b (in the cases of a wireless device). A slave FPGA counter is read at 603, and counter values T4 and F4 stamped into the probe packet at step 604. This allows a process for calculation of clock offset.

Figure 7:
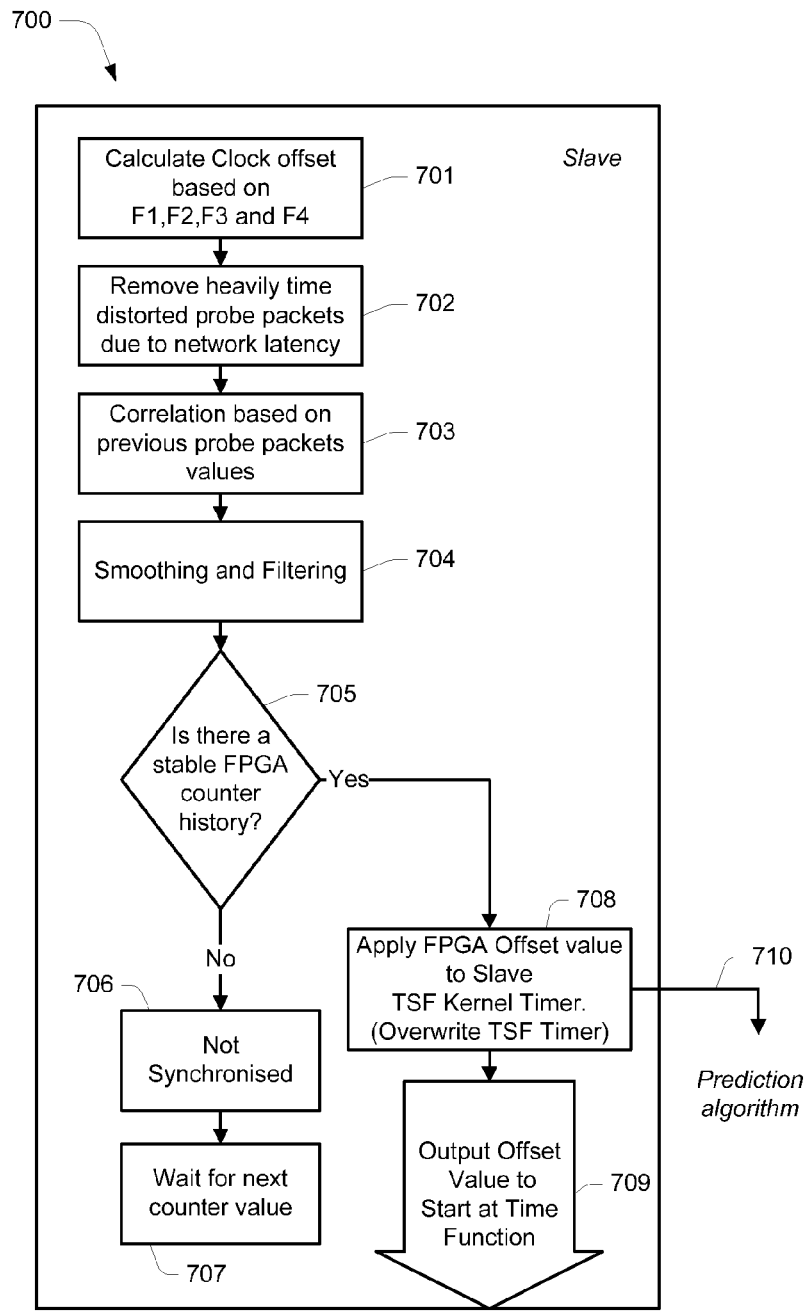
FIG. 7 illustrates a method according to one embodiment.
Figure 8:
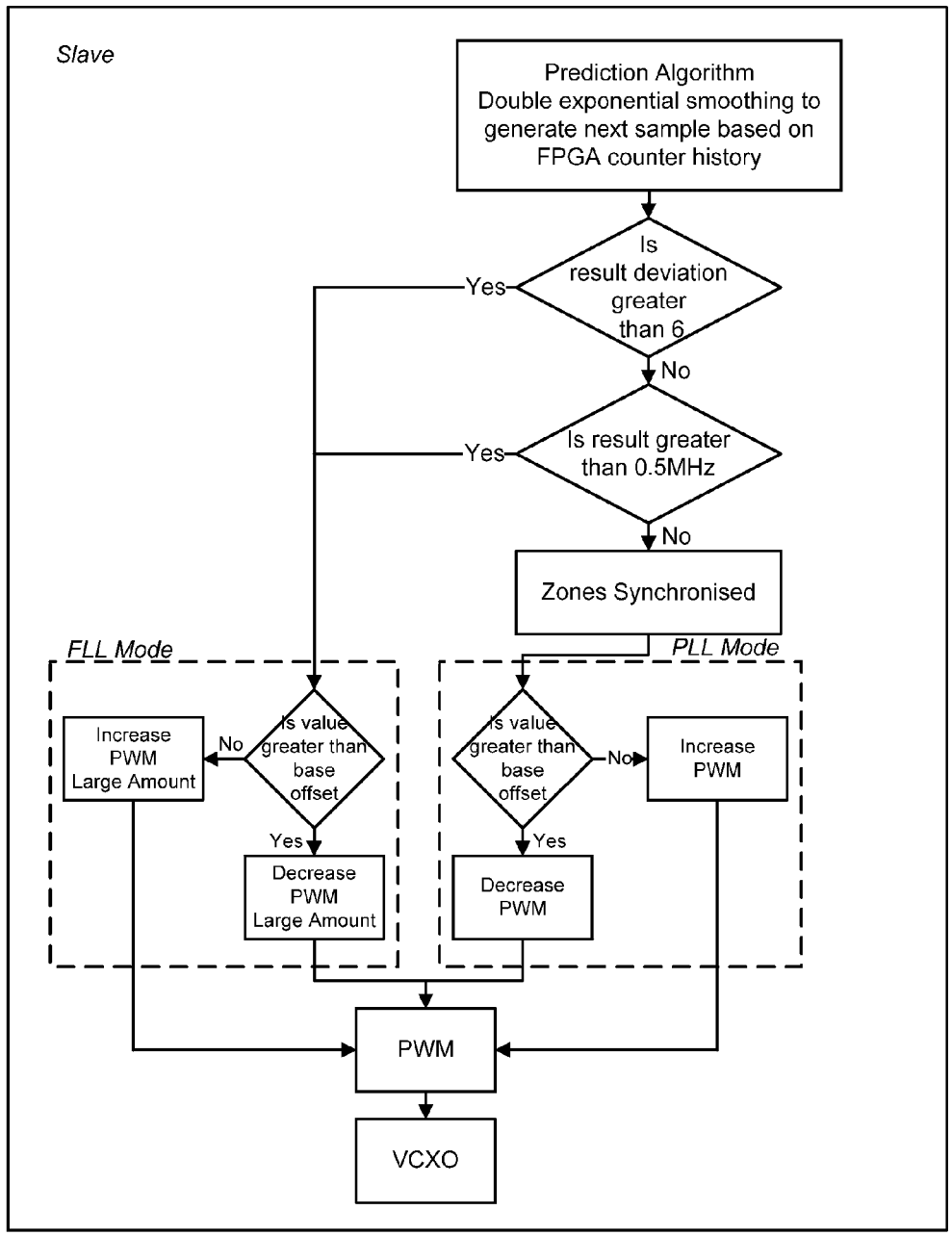
FIG. 8 illustrates a method according to one embodiment.
Figure 9:
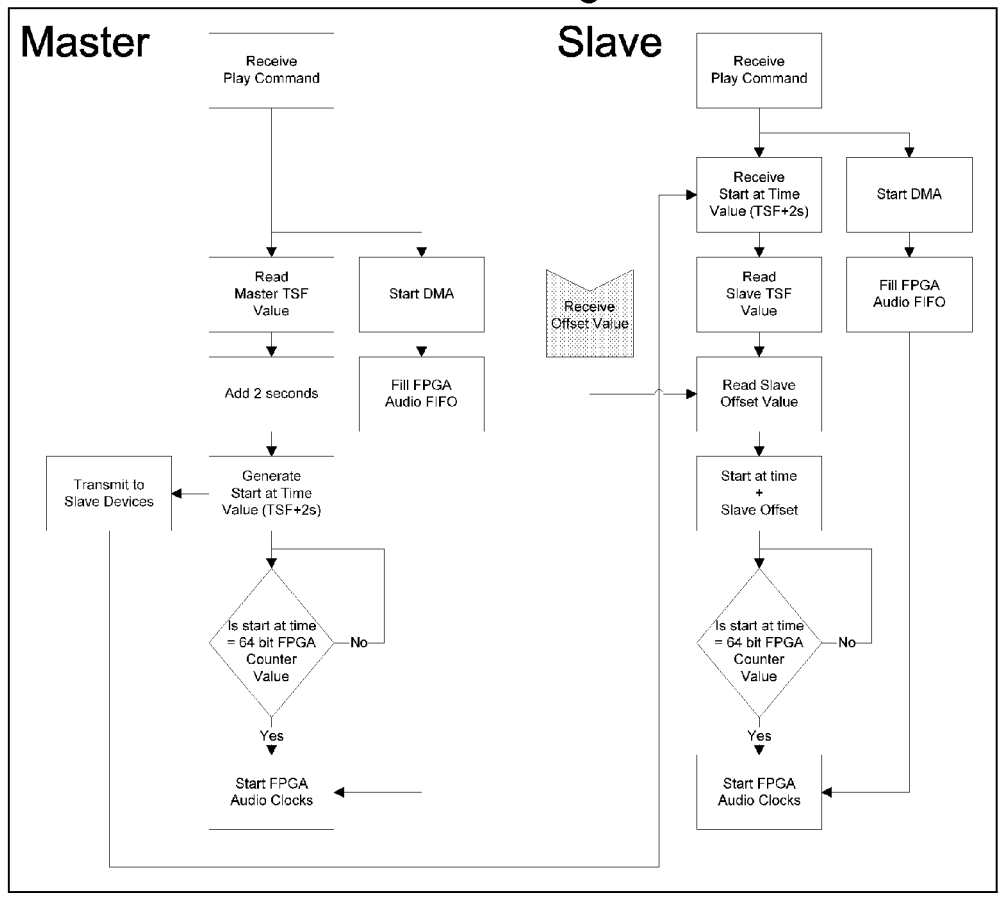
FIG. 9 illustrates a method according to one embodiment.
Figure 10:
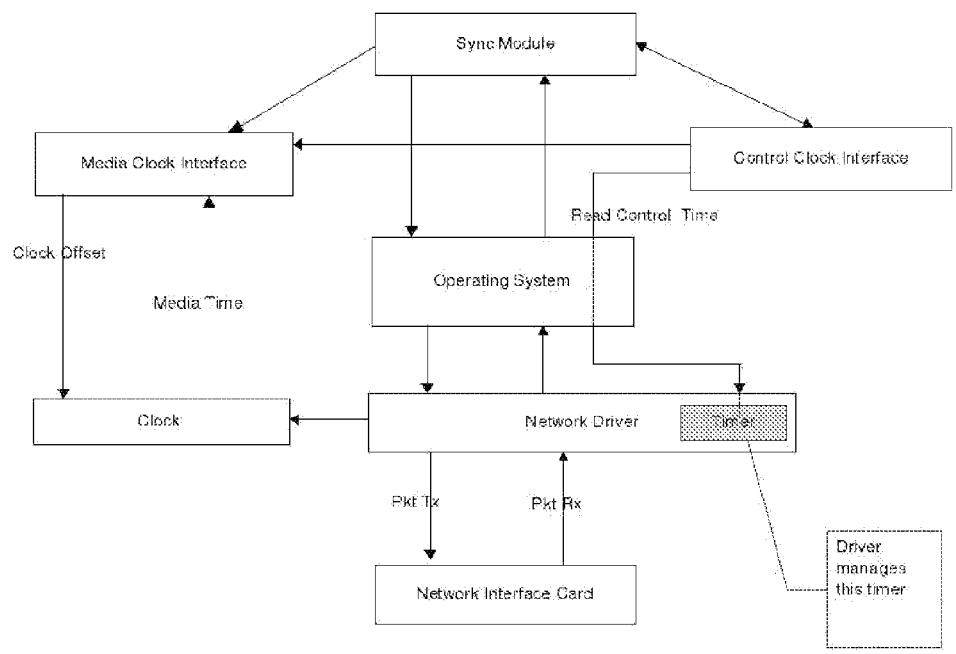
FIG. 10 illustrates an exemplary architecture according to one embodiment.
Figure 11:
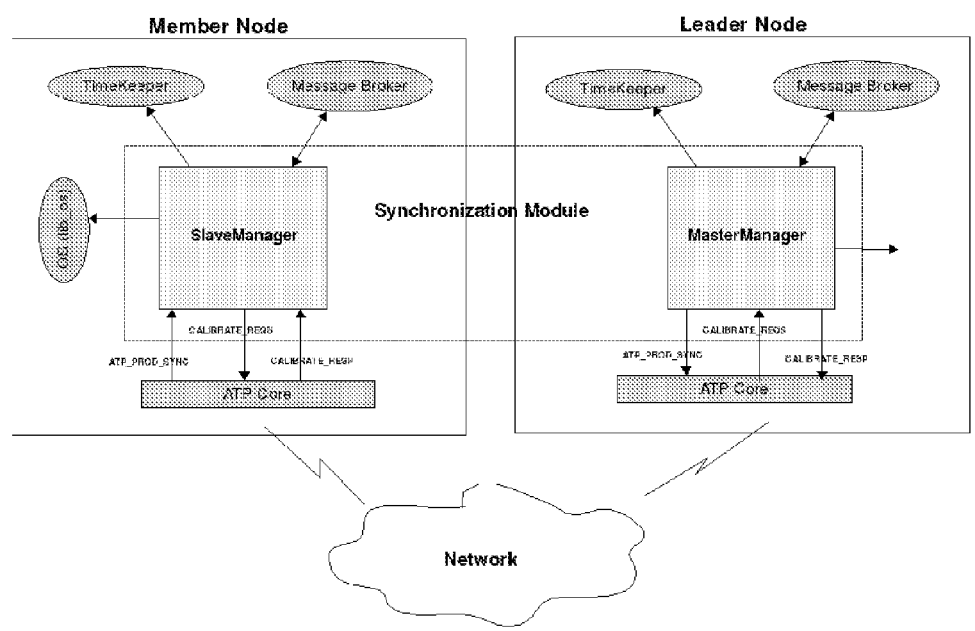
FIG. 11 illustrates an exemplary architecture according to one embodiment.

FIG. 7 illustrates an exemplary method 700, performed by a slave device, for calculating clock offset values for a set of probe packet responses. This is described with more detail in subsequent sections, and a brief overview follows. An offset is first calculated at 701 using F1 to F4 (or T1 to T4). Heavily time distorted packets are removed from consideration at 702. This is followed by a correlation process which compares a given packet with previous packets at 703, and smoothing/filtering at 704. Decision 705 takes into consideration whether there is a stable FPGA counter history. If not, it is determined that the device is not synchronized at 706, and the method waits for a next counter value at 707. Otherwise, the method includes applying the FPGA offset value to the slave TSF kernel timer at 708 (overwriting the TSF timer), and outputting the offset value to a Start At Time function at 709 (see FIG. 9 for overview of Start at Time function). In some cases step 708 provides output 710 to a prediction algorithm, as discussed (see FIG. 8 for overview of prediction algorithm).

Transmission of Multiple Probe Packets

As noted above, phase 101 includes the transmission of a plurality of probe packets. In particular, at each probing epoch a group of probe packets are transmitted from the slave device to the master device. In the present embodiment, each poll request has the following frame format.

TABLE 1

| Frame format of exemplary probe packet |
| --- |
| Probe Packet ID |
| Probe Packet Type (Request/Response) |
| Request Transmit Time |
| Request Receive Time |
| Response Transmit Time |
| Response Receive Time |

Some of these probe packets may be lost in the network due to congestion or network errors, while others may arrive at the slave device which initiated the sequence with different delays.

The successive probe packets in a group are generated with a small inter packet gap between them. This gap can either be a fixed value or a random value drawn from a predefined interval. This time gap between successive probe packets is, in practice, not in fact absolutely constant, even if a fixed value is assigned at a theoretical level. This is due to variations in processing delays.

Selection of Best Probe Packets

As mentioned, the successfully received probe packets may have experienced different network delays. Depending on the characteristics of the network, some of these packets may have been extremely distorted, resulting a very large RTT value. Therefore, in the context of phase 104, a first step of filtering includes a check to recognize such extremely distorted samples by comparing the RTT value of the received probe packet with a predefined threshold which is derived using the best RTT. All the probe packets with RTT value greater than the threshold value are discarded. This will avoid updating the slave clock using distorted values. All the probe packets passing this test will proceed to the next stage of filtering. In the current implementation we use the following formula to filter out distorted packets.

$$RTT_i < K_1 * RTT_{best} \rightarrow \qquad \text{Eq. (7)}$$

In the formula above, at least for the present embodiments, $K_1$ is set to (3/2).

Selection of Best Probe Packet from a Probe Group

After the first stage of filtering described above, there may be multiple probe responses available for a particular probe group. The present approach includes identifying and selecting the probe response with the minimum RTT, as shown in the following equation:

$$RTT_{select} = \min(\forall_j RTT_j) \rightarrow \qquad \text{Eq. (8)}$$

The underlying rationale is that the probe response with the minimum RTT delay is anticipated to have less asymmetry between forward and reverse network paths. This aspect is particularly significant in terms of accuracy. Estimates influenced by network delay variations are highly prone to errors resulting abrupt adjustments to the clock rate.

Other embodiments make use of alternate methodologies for filtering of received probe packets. For example, another approach is to collect a set of received probe packet samples, and process these using auto regressive techniques. That is, an auto-regressive averaging of the samples is performed thereby to identify best probe packet (or define parameters for a hypothetical best packet). Further embodiments make use of alternate filtering processes, such as a Karman filters and the like.

It will be appreciated that filter selection is in some cases performed responsive to particular characteristics of an implementation. For instance, depending on the location of the logic performing the synchronization process for a given node, different considerations apply. By way of example, the logic may be implemented on a PCI card or a USB device. The latter introduces a relatively greater delay, due to transmission times in USB cable and the like. Accordingly, it favors particular filtering approaches (such as the auto-regressive approach mentioned above). The present disclosure should not be regarded as being limited to any particular filtering techniques.

Correlation Based Selection of Probe Packets

After selecting the best probe response packet (i.e. packet with $RTT_{select}$) for a given probe group, a further processing step is performed to determine how the selected sample correlates to the samples chosen before. This stage of correlation analysis is important to identify a set of probe packets that have closely similar behavior, while removing those which are too deviated from the ongoing average value.

In the current implementation, for each selected sample, a step is performed to compute the value ρ which is an indication of how close the sample under consideration to the ongoing average value. In this regard, the following notation is used to represent the average value of previously selected samples:

$$\text{average}(\forall_{j<i} RTT_{select(j)})$$

From this, ρ is calculated as follows:

$$\rho = \frac{RTT_{select(i)}}{\text{average}(\forall_{j<i} RTT_{select(j)})} \rightarrow \qquad \text{Eq. (9)}$$

The ideal value for ρ is 1. This means the received sample has characteristics similar to the average characteristics of all the other selected samples. Therefore, those samples that produce ρ close to 1 are regarded as highly correlated samples. Any sample that produces ρ beyond a specified interval around 1 (Note: ρ=1 is the ideal) is discarded.

In the current implementation, the following formula is used to assess the correlation of the selected samples.

$$\begin{cases} \text{if } (1-K_2) < \rho_i < (1+K_2) \text{ then accept the sample} \\ \text{if } \rho_i < (1-K_2) \text{ OR } \rho_i > (1+K_2) \text{ then reject the sample} \end{cases} \rightarrow \qquad \text{Eq. (10)}$$

In the present embodiment, $K_2$ is set to 0.05. That is, all the samples that correspond to ρ in the interval [0.95,1.05] are permitted to move to the next stage of processing. Other values are used in further embodiments.

Smoothing Clock Offset Value θ of Selected Samples

For each of the probe packets passed the correlation stage, processing is performed to compute the clock offset value θ (Eq. (3)) and the RTT (Eq. (4)). Even though these samples are less distorted compared to the ones we eliminated in previous steps, the estimated clock offset value may be still dispersed due to variations in network delays. For this reason, the present approach includes steps intended to smooth these selected clock offsets to obtain an estimate by which to adjust the slave clock.

Further selection of these minimum clock offset values makes use of a sliding window. Let W be the window size at any time t. On selection of the sample with minimum RTT for each probe group, an entry for the selected probe packet is inserted into the sliding window of size W. Then the algorithm prepares a sorted clock offset variation vector as:

$$\Theta_t^w = [\theta_{t-w} \ldots \theta_i \ldots \theta_t], \text{ where } \theta_i \leq \theta_{i+1}.$$

From this, a filter is applied over this clock offset variation vector, thereby to obtain a smooth clock offset value. The present embodiment makes use of W=5 and a fifth order low pass hamming filter to smooth the clock offset variation vector. However, other values ad filters are used in further embodiments. For example, other low pass filters including rectangular filters, hanning filters or Blackman filters are used in various implementations.

Predicting the Clock Offset

Following extensive experimentation, it has been observed that variations of the measured clock offset drift value (clk-$err_i$) closely follow the variations of the network delay experienced by the probe packets. Present understandings suggest that these network delay variations are mainly due to the variations of the network load rather than spontaneous drifts in the clock. In addition to network loads, for wireless networks, random variations of channel quality have a direct impact on the latency experienced by packets. Motivated by such observations, the present approaches make use of use the concept of statistical process control to forecast the likely clock offset drift value based on the previous clock offset drift measurements. Such a proactive response assists to maintain a quasi stationary distance between the master clock and the slave clock more accurately than a reactive approach.

In the present embodiments, a prediction algorithm is used to track the clock offset drift to predict the future $clkerr_i$ and to use this predicted value to adjust the VCO feed value. This allows the slave side clock to adjust in advance for anticipated variations as decided by the prediction algorithm. Based on premise that the network load variations or wireless channel condition variations are not totally random in nature, double exponential smoothing is an appropriate choice for predicting $clkerr_i$. In particular, double exponential excels when the data has some form of trend. Therefore, by using the double exponential smoothing, it is possible to effectively take the binary decision of either to increase the VCO feed value or to decrease the VCO feed value.

As in every exponential smoothing technique, double exponential smoothing techniques assign exponentially decreasing weights as the measured $clkerr_i$ samples get older. In other words recent observations are given relatively more weight in forecasting than the older observations. The double exponential smoothing uses the following two equations to forecast $clkerr_i$:

$$S_t = ay_t + (1-a)(S_{t-1} + b_{t-1}) \rightarrow \qquad \text{Eq. (11)}$$

$$b_t = \gamma(S_t - S_{t-1}) + (1-\gamma)b_{t-1} \rightarrow \qquad \text{Eq. (12)}$$

The m-periods ahead forecast value for $clkerr_i$ are computed as:

$$clkerr_{(m+t)} = S_t + mb_t \rightarrow \qquad \text{Eq. (13)}$$

Note that the first smoothing equation (Eq. 11) adjusts $S_t$ directly for the clock error drift trend of the previous period, $b_t-1$, by adding it to the last smoothed value, $S_t-1$. This helps to eliminate the lag and brings $S_t$ to the appropriate base of the current value. The second smoothing equation (Eq. 12) then updates the trend, which is expressed as the difference between the last two values.

Estimation of VCO Feed Value

After calculating the clock error $clkerr_i$ (eq. 13), a member node adjust its FPGA clock for synchronization purposes. The clock adjustments to FPGA are accomplished in two stages:

Stage 1. Frequency Lock Loop (FLL)
Stage 2. Combined Phase Lock Loop (PLL) and FLL stage.

During the first FLL stage, fairly large adjustments are applied to the member (salve) FPGA clock to bring its frequency as close as possible to that of the master. Then, in the second stage, rather smaller adjustments are applied to correct the phase difference as well as the frequency difference. During this second stage of clock adjustment, calculations are made to determine the VCO value to be applied. This is presently achieved by taking the arithmetic mean of the FLL and the PLL VCO adjustments.

FLL Adjustments

After estimating the clock error, $clkerr_i$, which is actually the drift of clock difference from the initial offset between master's FPGA clock and the member's FPGA clock, the synchronization algorithm uses a PID loop during the FLL stage to converge the member clock towards the master clock. The underlying notion is to maintain the relative distance between these two clocks substantially constant. A frequency error value is estimated by dividing the difference between adjacent clock errors (say difference ($clker_{(i-1)}$, $clkerr_i$)) by the centre frequency $FPGA_iCENTRE_iFRQ$ of the member clock. The value of the $FPGA_iCENTRE_iFRQ$ is, for the present purposes, set to 103.2192 MHz. The $freerr_i$ is hence calculated as follows.

$$freerr_i = (clock_ierror_{(i+1)} - clock_ierror_i)/FPGA_i\ CENTRE_iFRQ \rightarrow \qquad \text{Eq. (14)}$$

The present approach is to keep track of the current frequency error, last frequency error, and group of historical frequency errors. The maximum number of historical frequency error entries in the group is controlled by a parameter NUM_HISTORY_SAMPLES. The value of NUM_HISTORY_SAMPLES is for the present purposes set to 20, although other values may be used. These historical measurements are used to calculate the average frequency error to be used in the integral component of the PID formula.

An underlying objective is to change both the phase and the frequency of the slave clock by changing the VCO value to drive the clock in the right direction to minimize the $freerr_i$.

The following standard PID formula is used to estimate a suitable VCO value ($VCO_{FLL}$) to feed into the slave side clock.

$$VCO_{FLL} = K_p * freerr_i + K_i * \int freerr_i + K_d * (freerr_{(i-1)} - freerr_i) \rightarrow \qquad \text{Eq. (15)}$$

The standard PID formula calculates the suitable VCO value by considering the effects of (a) current clock error (proportionate component) (b) past clock errors (integral component) (c) future trends in clock errors (derivative component).

PLL Adjustments

When the clock synchronization algorithm achieves its target average frequency error and target frequency error deviation, it will change its operating mode from FLL to PLL/FLL hybrid mode. During this hybrid mode, the algorithm attempts to lock the clock, so that it will not deviate outside of predetermined acceptance levels from the average clock error measured at the time the operating mode changes from the FLL to the PLL/FLL (i.e. $avg(clkerr_{(FLL \rightarrow PLL/FLL)})$).

On arrival of every probe response control message, the perceived clock error is calculated using the equation 13. After that, the difference between the $clkerr_i$ and the target clock error value $avg(clkerr_{(FLL \rightarrow PLL/FLL)})$ is run through a filter to calculate a suitable VCO feed ($VCO_{PLL}$) to correct the phase. In addition to that, equations 14 and 15 are used to calculate VCO feed value ($VCO_{FLL}$) for the FLL point of view. Then, a process is used to compute the arithmetic mean of $VCO_{PLL}$ and $VCO_{FLL}$, this being used to adjust the clock during the hybrid mode.

Conclusions

It will be appreciated that the disclosure above provides various advantageous systems and method for synchronization in a networked environment, particularly in the contest of a networked media arrangement. For example, embodiments are particularly applicable to wireless speaker subsystems, and it will be appreciated that in other embodiments other wireless media renderers are used. For example, wireless video units that receive over a wireless network data indicative of video and provide that video via a video output such as an LCD screen or an analogue or digital connection port.

Additionally, although the above embodiments have been described by reference to particular wired/wireless networking, in some embodiments alternate networking arrangements are used such as power line networks.

It should be appreciated that although the invention has been described in the context of the IEEE 802.11 standard, the invention is not limited to such contexts and may be utilized in various other applications and systems, for example in other systems that use OFDM. OFDM is one example of a multicarrier system in which the signal for transmission is split into a set of subcarriers. The invention may also be applicable to other wireless receivers that use multicarriers.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

While an embodiment has been described for operation in an OFDM receiver with RF frequencies in the 5 GHz range and 2.4 GHz range (the 802.11a and 802.11g variants of the IEEE 802.11 standard), the invention may be embodied in receivers and transceivers operating in other RF frequency ranges. Furthermore, while a transceiver embodiment for operation conforming to the IEEE 802.11 OFDM standards has been described, the invention may be embodied in transceivers conforming to other standards and for other applications, including, for example other WLAN standards and other wireless standards. Applications that can be accommodated include IEEE 802.11a COFDM wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable medium encoded with computer-executable code.

Furthermore, a computer-readable medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium encoded with a set of instructions, e.g., a computer program that are for execution on one or more processors, e.g., one or more processors that are part of a wireless speaker subsystem unit or other wireless media rendering device. Thus, as will be appreciated by those skilled in the art, embodiments of the present invention may be embodied as a method, an apparatus such as a special purpose apparatus, an apparatus such as a data processing system, or a computer-readable medium, e.g., a computer program product. The computer-readable medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of computer-readable medium (e.g., a computer program product on a computer-readable storage medium) encoded with computer-readable program code embodied in the medium.

The software may further be transmitted or received over a network via a network interface device. While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by one or more of the processors and that cause the one or more processors to perform any one or more of the methodologies of the present invention. A computer-readable medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "computer-readable medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

"Variants of the IEEE 802.11 standard" as used herein means the variants and proposed variants of the IEEE 802.11 standard. Variants are versions defined in clauses of the standard and proposed amendments of the standard.

It should be appreciated that although the invention has been described in the context of variants of the IEEE 802.11 standard, the invention is not limited to such contexts and may be utilized in various wireless and non-wireless network applications and systems.

In one embodiment the SPDIF enabled device becomes the leader. In some embodiments, the group and the media source will not be implicitly linked together, so it may be possible for one device to have the SPDIF input and another to provide the streaming source from SPDIF.

A networked digital media device may be connected through any form of computer network including networks with wired and wireless physical layers and networks consisting of multiple physical layers. The network through which the digital media device is connected does not affect the operation of the group other than to partially vary the extent to which synchronous playback is possible.

While in most of the description above, a set of wireless speakers is used as an example of a networked digital media player, the invention is not limited to wireless speakers. Those in the art would readily be able to modify the description provided herein for wireless speakers and apply the methods and apparatuses to other discrete media devices. Thus while in one embodiments, some of the media devices include a radio interface and the network includes a wireless network, in general, the invention is applicable to media devices that can connect to a computer network. The description is provided in terms of wireless speakers in order to keep the description simple and not obscure the inventive concepts.

Furthermore, in most of the description above, a wireless audio system is used as an example of a networked digital media playback system—i.e., as an example of a system that allows one or more devices connected via a computer network to render digital media, the invention is not limited to a wireless audio system. Those of ordinary skill in the art would readily be able to modify the description provided for wireless audio systems herein and apply the methods and apparatuses to other digital media playback systems. The description is provided in terms of wireless speakers and a wireless audio system in order to keep the description simple and not obscure the inventive concepts.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method, performed by a networked slave device, for synchronizing a local clock of the networked slave device with respect to a master clock of a master device, the method including:
   (a) providing a group of probe frames to the master device, thereby to receive responses in respect of at least a selection of these probe frames, wherein each response includes data for allowing determination of an estimated clock offset, wherein the master device has access to observe a global clock value for a wireless network, and wherein the slave device and the master device are connected to different communication media;
   (b) filtering the responses, thereby to identify one or more best responses for the group of probe frames;
   (c) repeating steps (a) and (b) for successive groups of probe frames thereby to identify a respective one or more best responses for the successive groups of probe frames;
   (d) selectively calculating estimated clock offset values using the one or more best responses in respect of each group of probe frames to determine a relative clock offset drift based on:
      (i) Return Trip Times (RTTs) for the one or more best responses with respect to their respective probe frames;
      (ii) a probe frame transmission timestamp taken with respect to the local clock of the networked slave device;
      (iii) a probe frame receiving timestamp taken with respect to the master clock of the master device;
      (iv) a response transmission timestamp taken with respect to the master clock of the master device; and
      (v) a response receiving timestamp taken with respect the local clock of the networked slave device; and
   (e) repeatedly adjusting the local clock of the networked slave device based on calculations of the relative clock offset drift.

2. A method according to claim 1 wherein the networked slave device communicates with the master device over hybrid network including at least one wired communications path and one wireless communications path.

3. A method according to claim 1 wherein the data for allowing determination of an estimated clock offset includes timing information associated with the probe frame by the slave device and timing information associated with the probe frame by the slave device the master device.

4. A method according to claim 1 wherein the probe frames in the group are generated for successive transmission with a small gap between successive frames.

5. A method according to claim 1 including processing the responses based on RTT value, and discarding responses with RTT value greater than a predefined threshold value.

6. A method according to claim 1 including for each identified best response, computing a value indicative of how close the response under consideration is to an ongoing average value.

7. A method according to claim 1 wherein a prediction algorithm is used to track the clock offset drift on an ongoing basis thereby to predicatively to adjust the VCO feed value.

8. A method according to claim 1 wherein the slave device is configured for playing back media data in synchronicity with the master device.

9. A method according to claim 1 wherein the slave device is a networked media playback unit.

10. A non transitive computer readable medium carrying computer executable code that, when executed by one or more processors of a device, configure the device to perform a method according to claim 1.

11. A networked device, configured to operate as a networked slave device, for synchronizing a local clock of the networked slave device with respect to a master clock of a master device, the networked slave device including:
(i) a processor; and
(ii) a memory device configured to store software instructions to configure the slave device to perform a method including:
(a) providing a group of probe frames to the master device, thereby to receive responses in respect of at least a selection of these probe frames, wherein each response includes data for allowing determination of an estimated clock offset, wherein the master device has access to observe a global clock value for a wireless network, and wherein the slave device and the master device are connected to different communication media;
(b) filtering the responses, thereby to identify one or more best responses for the group of probe frames;
(c) repeating steps (a) and (b) for successive groups of probe frames thereby to identify a respective one or more best responses for the successive groups of probe frames;
(d) selectively calculating estimated clock offset values using the one or more best responses in respect of each group of probe frames to determine a relative clock offset drift based on:
(i) Return Trip Times (RTTs) for the one or more best responses with respect to their respective probe frames;
(ii) a probe frame transmission timestamp taken with respect to the local clock of the networked slave device;
(iii) a probe frame receiving timestamp taken with respect to the master clock of the master device;
(iv) a response transmission timestamp taken with respect to the master clock of the master device; and
(v) a response receiving timestamp taken with respect the local clock of the networked slave device; and
(e) repeatedly adjusting the local clock of the networked slave device based on calculations of the relative clock offset drift.

12. A device according to claim 11 wherein the networked slave device communicates with the master device over hybrid network including at least one wired communications path and one wireless communications path.

13. A device according to claim 11 wherein the data for allowing determination of an estimated clock offset includes timing information associated with the probe frame by the slave device and timing information associated with the probe frame by the slave device the master device.

14. A device according to claim 11 wherein the probe frames in the group are generated for successive transmission with a small gap between successive frames.

15. A device according to claim 11 wherein the method includes processing the responses based on RTT value, and discarding responses with RTT value greater than a predefined threshold value.

16. A device according to claim 11 wherein the method includes for each identified best response, computing a value indicative of how close the response under consideration is to an ongoing average value.

17. A device according to claim 11 wherein a prediction algorithm is used to track the clock offset drift on an ongoing basis thereby to predicatively to adjust the VCO feed value.

18. A device according to claim 11 wherein the slave device is configured for playing back media data in synchronicity with the master device.

19. A device according to claim 11 wherein the slave device is a networked media playback unit.

* * * * *